US010249194B2

(12) United States Patent
Erickson et al.

(10) Patent No.: US 10,249,194 B2
(45) Date of Patent: Apr. 2, 2019

(54) MODIFYING BEHAVIOR OF AUTONOMOUS VEHICLE BASED ON ADVANCED PREDICTED BEHAVIOR ANALYSIS OF NEARBY DRIVERS

(71) Applicant: International Business Machines Corporation, Armonk, NY (US)

(72) Inventors: Thomas D. Erickson, Minneapolis, MN (US); Clifford A. Pickover, Yorktown Heights, NY (US); Aisha Walcott, Nairobi (KE); Komminist Weldemariam, Niarobi (KE)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/251,104

(22) Filed: Aug. 30, 2016

(65) Prior Publication Data

US 2018/0061237 A1  Mar. 1, 2018

(51) Int. Cl.
*G08G 1/16* (2006.01)
*G01C 22/00* (2006.01)
(Continued)

(52) U.S. Cl.
CPC ............ *G08G 1/163* (2013.01); *B60W 40/02* (2013.01); *B60W 40/09* (2013.01); *G05D 1/0088* (2013.01); *G05D 1/0214* (2013.01); *G08G 1/0112* (2013.01); *G08G 1/0129* (2013.01); *G08G 1/0141* (2013.01); *G08G 1/164* (2013.01); *G08G 1/166* (2013.01); *G08G 5/0069* (2013.01); *B60W 2540/30* (2013.01); *B60W 2550/12* (2013.01); *B60W 2750/30* (2013.01)

(58) Field of Classification Search
CPC ............ G08G 1/163; G08G 1/16; G06N 3/08; G05D 1/0088; G05D 1/00; G05D 1/02; B62D 15/18; B62D 15/02; A61B 5/18; B60R 21/00; G01C 22/00
See application file for complete search history.

(56) References Cited

U.S. PATENT DOCUMENTS 6,060,989 A   5/2000 Gehlot
6,151,539 A  11/2000 Bergholz
(Continued)

FOREIGN PATENT DOCUMENTS

JP   2006213276 A  *  8/2006  ............ B60R 21/00
JP   2012093883 A  *  5/2012  ............... G08G 1/16
WO   01/88827 A1   11/2001

*Primary Examiner* — Yuri Kan
(74) *Attorney, Agent, or Firm* — Harrington & Smith

(57) ABSTRACT

A method, apparatus, and computer program product for assessing one or more features of drivers within a threshold distance of a self-driving vehicle which has sensors to monitor driving conditions on a travel route within the threshold distance, predicting the behavior of one or more vehicles within the threshold distance based on the assessment of those features, and utilizing the predicted behavior for the self-driving vehicle to drive on the travel route. Changes in the condition or usage of the travel route, the surroundings, and pedestrians and other types of vehicles in the vicinity of the travel route can go into the assessment. Changes in the assessment can alert the self-driving vehicle to change course and the way it monitors data. Information regarding other drivers can be privatized and utilized using a blockchain system.

19 Claims, 6 Drawing Sheets

(51) Int. Cl.
*A61B 5/00* (2006.01)
*B60R 21/00* (2006.01)
*B62D 15/02* (2006.01)
*G05D 1/02* (2006.01)
*G06N 3/08* (2006.01)
*G08G 5/00* (2006.01)
*B60W 40/09* (2012.01)
*B60W 40/02* (2006.01)
*G05D 1/00* (2006.01)
*G08G 1/01* (2006.01)

(56) References Cited

U.S. PATENT DOCUMENTS

| | | | |
|---|---|---|---|
| 6,393,362 | B1 | 5/2002 | Burns |
| 6,960,168 | B2 * | 11/2005 | Yanagidaira ............. A61B 5/18 128/920 |
| 7,996,836 | B1 | 8/2011 | McCorkendale et al. |
| 8,655,537 | B2 * | 2/2014 | Ferguson ................ G05D 1/00 701/23 |
| 9,254,870 | B2 * | 2/2016 | Lee .................... B62D 15/0285 |
| 2010/0228427 | A1 | 9/2010 | Anderson et al. |
| 2012/0095660 | A1 | 4/2012 | Breuer et al. |
| 2015/0179069 | A1 | 6/2015 | Cazanas et al. |
| 2015/0253778 | A1 * | 9/2015 | Rothoff ................ G05D 1/0088 701/25 |
| 2017/0098158 | A1 * | 4/2017 | Yufik ....................... G06N 3/08 |

* cited by examiner

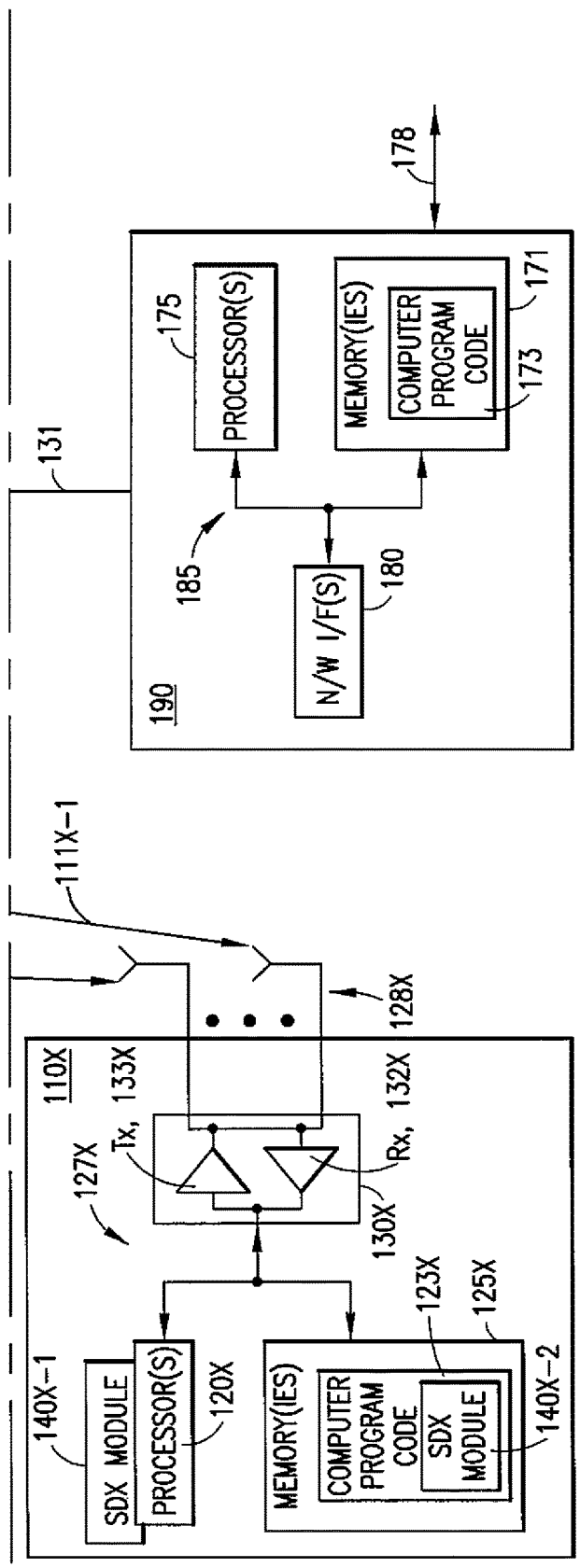

MODIFYING BEHAVIOR OF AUTONOMOUS VEHICLE BASED ON ADVANCED PREDICTED BEHAVIOR ANALYSIS OF NEARBY DRIVERS

TECHNICAL FIELD

This invention relates generally to self-driving vehicle (SDV) and, in particular, to assessing features of nearby drivers and predicting behavior of nearby vehicles.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Autonomous vehicles offer the prospect of eliminating the dangers of erratic driving or accidents. Specifically, the lack of human error while driving looks to result in a safer journey. Sensors in the autonomous vehicles appear to also allow for them to pack closer together, allowing more on the road, possibly shortening traffic times. Fully autonomous vehicles would also eliminate the need to pass a driving test or gain a driving license.

Nonetheless, there remain disadvantages to autonomous vehicles. One is the persistent worry of the computer crashing or malfunctioning, resulting in a major collision. Moreover, when they are first released, they are likely to be extremely expensive, most people won't be able to afford them, and the concept of driving car will likely remain appealing. Therefore, a large segment of the population will most likely want to keep normal cars.

The interaction between one autonomous vehicle and another autonomous vehicle while being complex may actually be less complex than the interactions between autonomous vehicles and those driven by humans.

Modifying behavior of autonomous vehicle based on predicted behavior of other vehicles is discussed in U.S. Pat. No. 8,655,537 B2. There, a vehicle being configured to operate in an autonomous mode could determine a current state of the vehicle and the current state of the environment of the vehicle, where the environment of the vehicle includes at least one other vehicle. A predicted behavior of the at least one other vehicle could be determined based on the current state of the vehicle and the current state of the environment of the vehicle. The reference discusses a confidence level could be determined based on the predicted behavior, the current state of the vehicle, and the current state of the environment the vehicle is in. In some embodiments, the confidence level may be related to the likelihood of the at least one other vehicle performing the predicted behavior. Such a vehicle in the autonomous mode was envisioned by the reference as being controlled based on the predicted behavior, the confidence level, and the current state of the vehicle and its environment.

Also in relation to a surface mine, U.S. Pat. No. 6,393,362 B1 discusses a dynamic safety envelope for an autonomous vehicle collision avoidance system. Each autonomous vehicle performs according to a predetermined trajectory related to its particular task and implemented by a guidance system through on-board GPS and two-way communications. The current position of the vehicle is continuously monitored and correlated to the position of potential hazards along its path, so that corrective action can be taken by implementing appropriate, predetermined control strategies. Each vehicle is assigned a safety envelope that accounts for the vehicle's physical presence and operating tolerances. The safety envelope is characteristic of each vehicle and is defined by a variable space surrounding the vehicle wherein it may be physically present as it travels along its intended trajectory. The shape and size of the safety envelope is dynamically varied to meet safety requirements for current trajectory conditions facing the vehicle as it performs its autonomous function along its predetermined path. The safety envelope is changed according to a predetermined set of rules specific to the vehicle. Intersections between predetermined vehicle trajectories along paths and roadways within the mine's property are identified dynamically by monitoring current traffic conditions and establishing locations where the safety envelopes of vehicles traveling along approaching trajectories could overlap.

WO 2001/088827 A1 discusses a permission system for control of autonomous vehicles in a mining operation, where such autonomous vehicle traffic is controlled by dividing predetermined trajectories into zones of free operation, called "permission zones", wherein the vehicle is allowed to move according to predetermined permission parameters but unhindered by other constraints. Theses permission zones would be assigned and activated using criteria that ensure the vehicle would remain entirely within active zones so long as the vehicle acts within those predetermined permission parameters. Before it can begin to move, each autonomous vehicle is assigned an active permission zone that includes its current location. Each permission zone is also associated with a maximum velocity profile that ensures stoppage of the vehicle at the end of the permission zone. Subsequent permission zones along a predetermined trajectory would be assigned to a vehicle as soon as all other system constraints make it available.

U.S. Pat. No. 6,151,539 A is a patent that discusses autonomous vehicle arrangement and control by receiving one or more travel orders, route planning using position finding and digital street map, generating a vehicle path, sensors including for detecting objects and the condition features of the route, collision avoidance, vehicle condition data recognition, and controlling the vehicle, where the sensors were in various arrays and also used cameras.

U.S. Pat. No. 6,060,989 A is a reference that discusses preventing automobile accidents by using sensors positioned to sense conditions indicative of a drivers ability to effectively control the vehicle, analyzing the data to determine an appropriate response, and initiating the response.

US 2012/0095660 A1 is a reference that discusses autonomous emergency braking in a road vehicle in order to reduce the severity of an accident, the speed of the vehicle being determined during the autonomous emergency braking. A determination of speed which is independent of the wheel rotational speeds of the vehicle is used. By this means, the vehicle speed can be determined sufficiently accurately even in the cases in which, as a result of sharp autonomous braking, the vehicle speed would be higher than the wheel rotational speeds.

US 2010/0228427 A1 is a reference that discusses a predictive semi-autonomous vehicle navigation system. As described therein, an active safety framework performs trajectory planning, threat assessment, and semi-autonomous control of passenger vehicles. The vehicle navigation task is formulated as a constrained optimal control problem. A predictive, model-based controller iteratively plans an optimal or best-case vehicle trajectory through a constrained corridor. This best-case scenario is used to establish the minimum threat posed to the vehicle given its current state, current and past driver inputs/performance, and environmental conditions. Based on this threat assessment, the level of controller intervention required to prevent collisions or instability is calculated and driver/controller inputs are scaled accordingly so as to hopefully minimize controller intervention while ensuring that the vehicle does not depart from a traversable corridor.

US 2015/0179069 A1 is a reference that discusses an accident prevention system configured to analyze road data in view of the at least one vehicle attribute included in vehicle data. The application may also determine whether the road data is relevant and transmit, in response to the road data being relevant, a command to a display unit to display information based on the analysis of the road data.

The current invention moves beyond these techniques and materials.

Abbreviations that may be found in the specification and/or the drawing figures are defined within the text and in the detailed description section where appropriate.

BRIEF SUMMARY

This section is intended to include examples and is not intended to be limiting.

An example of an embodiment is a method that comprises assessing one or more features of drivers within a threshold distance of a self-driving vehicle, wherein the self-driving vehicle comprises sensors to monitor driving conditions on a travel route within the threshold distance, predicting the behavior of one or more vehicles within the threshold distance based on the assessing, and driving by the self-driving vehicle on the travel route utilizing the predicted behavior.

Another example of an embodiment is an apparatus, comprising at least one processor; and at least one memory including computer program code, the at least one memory and the computer program code configured to, with the at least one processor, cause the apparatus to perform at least the following: assessing one or more features of drivers within a threshold distance of a self-driving vehicle, wherein the self-driving vehicle comprises sensors to monitor driving conditions on a travel route within the threshold distance; based on the assessing, predicting the behavior of one or more vehicles within the threshold distance; and driving by the self-driving vehicle on the travel route utilizing the predicted behavior.

Yet an additional example of an embodiment is a computer program product comprising a tangible computer-readable medium bearing computer program code embodied therein for use with a computer, the computer program code comprising code for: assessing one or more features of drivers within a threshold distance of a self-driving vehicle, wherein the self-driving vehicle comprises sensors to monitor driving conditions on a travel route within the threshold distance; based on the assessing, predicting the behavior of one or more vehicles within the threshold distance; and driving by the self-driving vehicle on the travel route utilizing the predicted behavior.

While still a further example of an embodiment is an apparatus with means for assessing one or more features of drivers within a threshold distance of a self-driving vehicle, wherein the self-driving vehicle comprises sensors to monitor driving conditions on a travel route within the threshold distance, means for predicting the behavior of one or more vehicles within the threshold distance based on the assessing, and means for driving by the self-driving vehicle on the travel route utilizing the predicted behavior.

Additional examples of embodiments discuss the aspects which affect the determination of the threshold distance, the assessment, and the utilizing of information. In particular, exemplary embodiments herein discuss the use of block-chain regarding information gathered and used by the invention.

BRIEF DESCRIPTION OF THE DRAWINGS

In the attached Drawing Figures:

FIG. 1A illustrates an exemplary embodiment of a traffic situation where the self-driving vehicle is on a travel route with other self-driving vehicles, non-self-driving vehicles (perhaps designated as human driven vehicles), pedestrians, and other road obstacles, and where FIG. 1B, which has one view which is broken into two pages 1B-1 and 1B-2 for ease of viewing, depicts a block diagram of a system showing components of an examples of an embodiment of the present invention;

DETAILED DESCRIPTION OF THE DRAWINGS

In order to overcome some of the disadvantages of the current state of affairs, exemplary embodiments of the current invention look to modify the behavior of an autonomous vehicle based on advanced predicted behavior analysis of nearby drivers.

The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Therefore, the exemplary embodiments herein describe techniques for a self-driving vehicle to assess features of nearby drivers, and predicting behavior of nearby vehicles driven by those drivers. Additional description of these techniques is presented after a system into which the exemplary embodiments may be used is described.

Figure 1A:
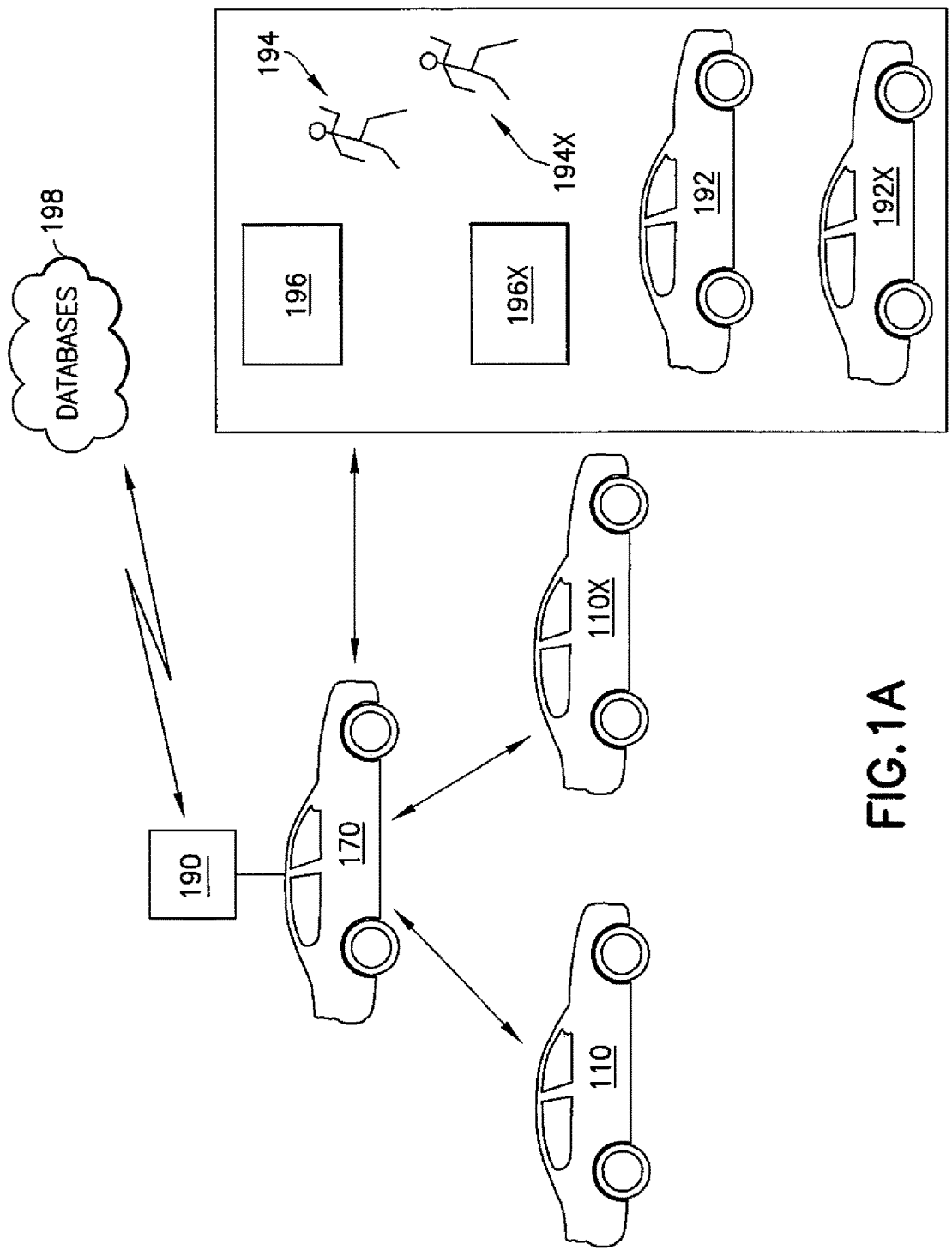
FIG. 1A and FIG. 1B are block diagrams of one possible and non-limiting exemplary system in which the exemplary embodiments may be practiced, where
Figures 1, 1B:
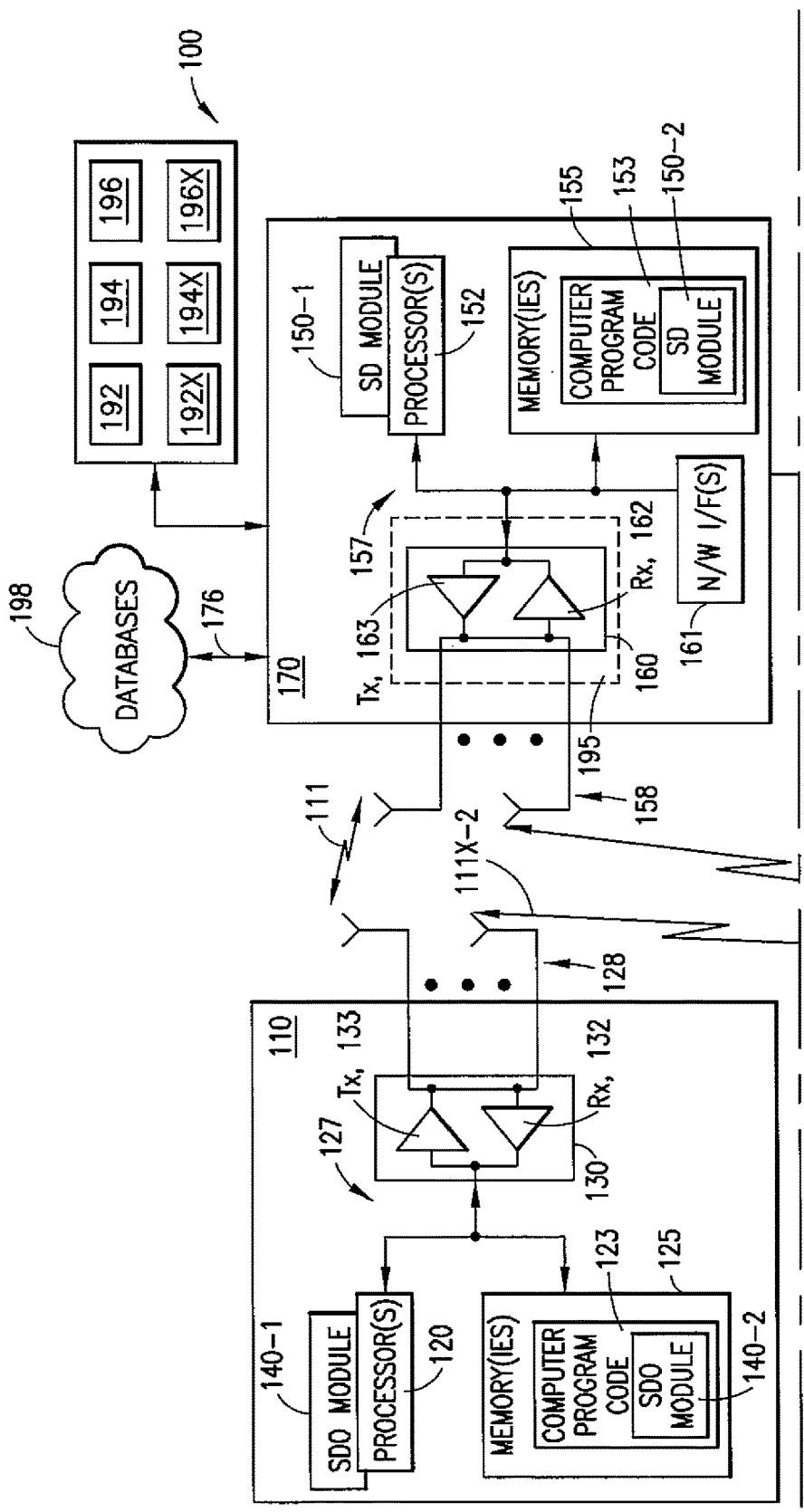

FIG. 1A and FIG. 1B (collectively also referred to as FIG. 1 herein) show block diagrams of a system in which the examples of embodiments of the invention may be practiced.

In FIG. 1A, a traffic situation is depicted where the SDV 170 is on a travel route with other self-driving vehicles 110 through 110X, non-self-driving vehicles, perhaps designated as human driven vehicles, 192 through 192X, pedestrians 194 through 194X, obstacles 196 through 196X. Naturally the number of these other participants along the travel route could vary from zero to some number greater than zero. Within our SDV 170 might also reside some remote device(s) 190 such that it could communicate with remote database(s) 198. All the participants on the route could also have access to database(s) 198 as well as SDV 170 itself although not pictured in FIG. 1A). Obstacles could range from debris in the road to building which cut off a view to even a stopped or dead vehicle. Vehicles described by any of the figures have been made to look like cars but they could also be trucks, motorcycles, construction equipment, mining equipment, or the entire picture could represent a submarine route, a water route, and aerial route, or an underground route. The care traffic scenario is shown for convenience and is non-limiting. Also note that the lines going to and from SDV 170 can be both sensor detection and wireless communication. The link between SDV 170 and remoter device 190 might be wired or wireless and might not even need to reside in the car. Databases 198 also need not be remote but might be resident in the SDV 170 itself, in device 190, or elsewhere. Again, the figure is drawn for understanding and convenience and is not limiting. The scene, save for perhaps the remote databases, are all thought to be nearby or within the threshold distance, as discussed in more detail below.

In FIG. 1B, inner workings of the devices doing the self-driving are shown in an exemplary and non-limiting fashion. The SDV 170 receives external information from another self-driving vehicle SDVO 110 with the vicinity 100 of the SDV either by distance, sensor range, or communications range. The SDV 170 includes one or more processors 152, one or more memories 155, one or more network interfaces 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The SDV 170 includes a SD-Module 150, comprising one of or both parts 150-1 and/or 150-2, which may be implemented in a number of ways. The methods discussed herein are assumed to be performed by the respective modules.

Figure 2:
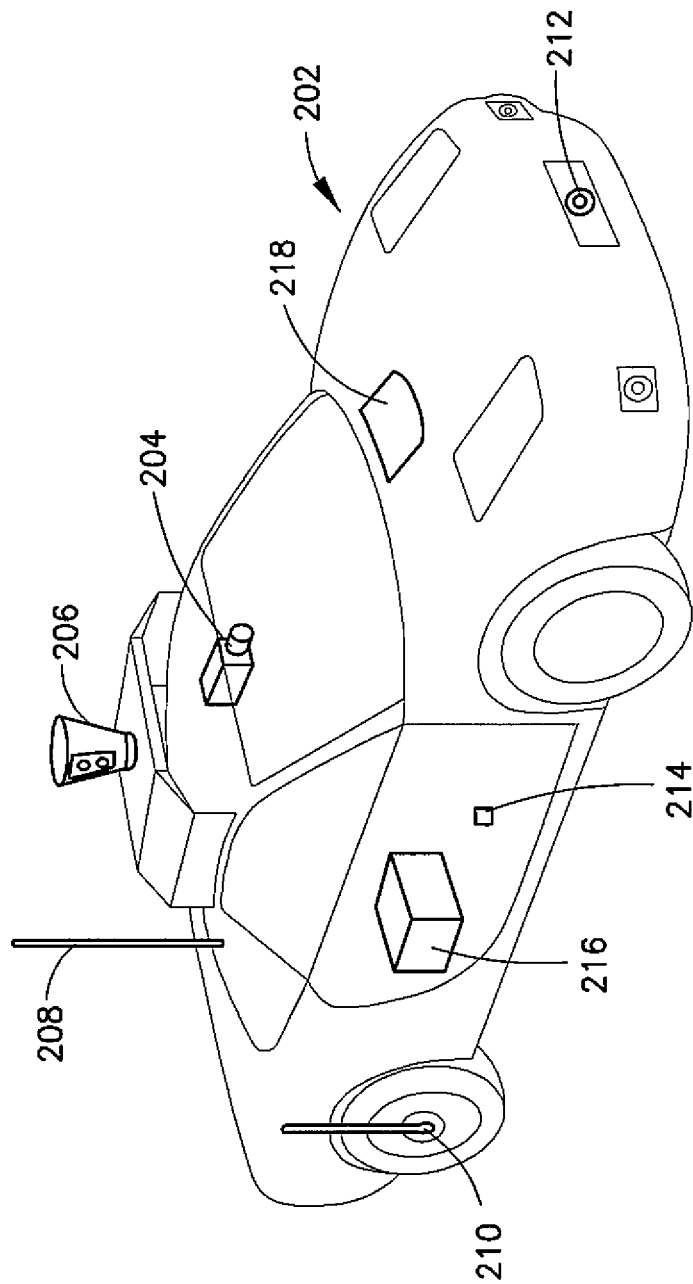
FIG. 2 illustrates a automobile equipped with various non-limiting equipment to enhance its use as an autonomous vehicle according to an example of an embodiment of the present invention.

The SD-Module 150 may be implemented in hardware as SD-Module 150-1, such as being implemented as part of the one or more processors 152. The SD-Module 150-1 may be implemented also as an integrated circuit or through other hardware such as a programmable gate array. In another example, the SD-Module 150 may be implemented as SD-Module 150-2, which is implemented as computer program code 153 and is executed by the one or more processors 152. For instance, the one or more memories 155 and the computer program code 153 are configured to, with the one or more processors 152, cause the SDV 170 to perform one or more of the operations as described herein. The one or more network interfaces 161 communicate over a network such as via the link 176, which goes to the cloud or some remote storage device that directly transmits and receives information discussed herein that goes to the SDV in making decisions and link 131 that gets such information through an intermediary device. The SDV also collects information with all the sensors in the vehicle itself, examples of which are illustrated in FIG. 2.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the SDV 170 being physically in a different location from the RRH, and the one or more buses 157 could be implemented in part as fiber optic cable to connect the other elements of the SDV 170 to the RRH 195.

Turning to another self-driving vehicle (SDVO) 110 that would also include one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The SDVO 110 includes an SDO-Module 140, comprising one of or both parts 140-1 and/or 140-2, which may be implemented in a number of ways. The SDO-Module 140 may be implemented in hardware as SDO-Module 140-1, such as being implemented as part of the one or more processors 120. The SDO-Module 140-1 may be implemented also as an integrated circuit or through other hardware such as a programmable gate array. In another example, the SDO-Module 140 may be implemented as SDO-Module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. If the other SDVO 110 is not able to communicate with SDV 170 directly, then other SDVO 110 may communicate with yet a further self-driving vehicle SDVX 110X via a wireless link 111X-2. Then SDVX 110X communicates with SDV 170 via wireless link 111X-1. If the SDVO 110 does communicate with SDV 170, then it does so via wireless link 111.

Intermediary device 190 that may include functionality which provides connectivity with a further network, such as a data communications network (e.g., via the Internet). The SDV 170 and other SDVs could be coupled via links 131 to the intermediary device 190. The intermediary device 190 includes one or more processors 175, one or more memories 171, and one or more network interfaces 180, interconnected through one or more buses 185. The one or more memories 171 include computer program code 173. The one or more memories 171 and the computer program code 173 are configured to, with the one or more processors 175, cause the intermediary device 190 to perform one or more operations. Intermediary device 190 can communicate with the remote same database(s) 198 that SDV 170 does using link 176 by intermediary device 190 using link 178.

Turning to the yet further self-driving vehicle SDVX 110X, which includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The SDVX 110X includes an SDX-Module 140X, comprising one of or both parts 140X-1 and/or 140X-2, which may be implemented in a number of ways. The SDX-Module 140X may be implemented in hardware as SDX-Module 140X-1, such as being implemented as part of the one or more processors 120X. The SDX-Module 140X-1 may be implemented also as an integrated circuit or through other hardware such as a programmable gate array. In another example, the SDX-Module 140X may be implemented as SDX-Module 140X-2, which is implemented as computer program code 123X and is executed by the one or more processors 120X. For instance, the one or more memories 125X and the computer program code 123X may be configured to, with the one or more processors 120X, cause the yet further SDVX 110X to perform one or more of the operations as described herein. The yet further SDVX 110X communicates with SDV 170 via a wireless link 111X-1. The remote yet further SDVO 110 communicates with the yet further SDVX 110X via a wireless link 111X-2.

The SDV activities are implemented using hardware such as processors 152 and 175 and memories 155 and 171.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the SDVO 110 and SDVX 110X would be vehicles that the SDV 170 would communicate with in a similar traffic stream.

Also pictured, as noted earlier, are vehicles 192 and 192X which are not self-driving vehicles, pedestrians 194 and 194X, and other obstacles 196 and 196X. There could be many other items in the vicinity of SDV 170 that are not pictured. Furthermore, communication between SDV 170 not only could take place between the components shown but also other objects not pictured such as between a GPS transmitter/receiver and a satellite tracking station or ground based relay, for example. Again, the figure an example of a configuration and not limiting.

Embodiments herein may be implemented in software (executed by one or more processors), hardware (for example, an application specific integrated circuit), or a combination of software and hardware. For example, in an embodiment, the software (for example, application logic, an instruction set, etc.) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, for instance, in FIG. 1A. A computer-readable medium may comprise a computer-readable storage medium (for instance, memories 125, 125X, 155, 171, or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

Figure 4:
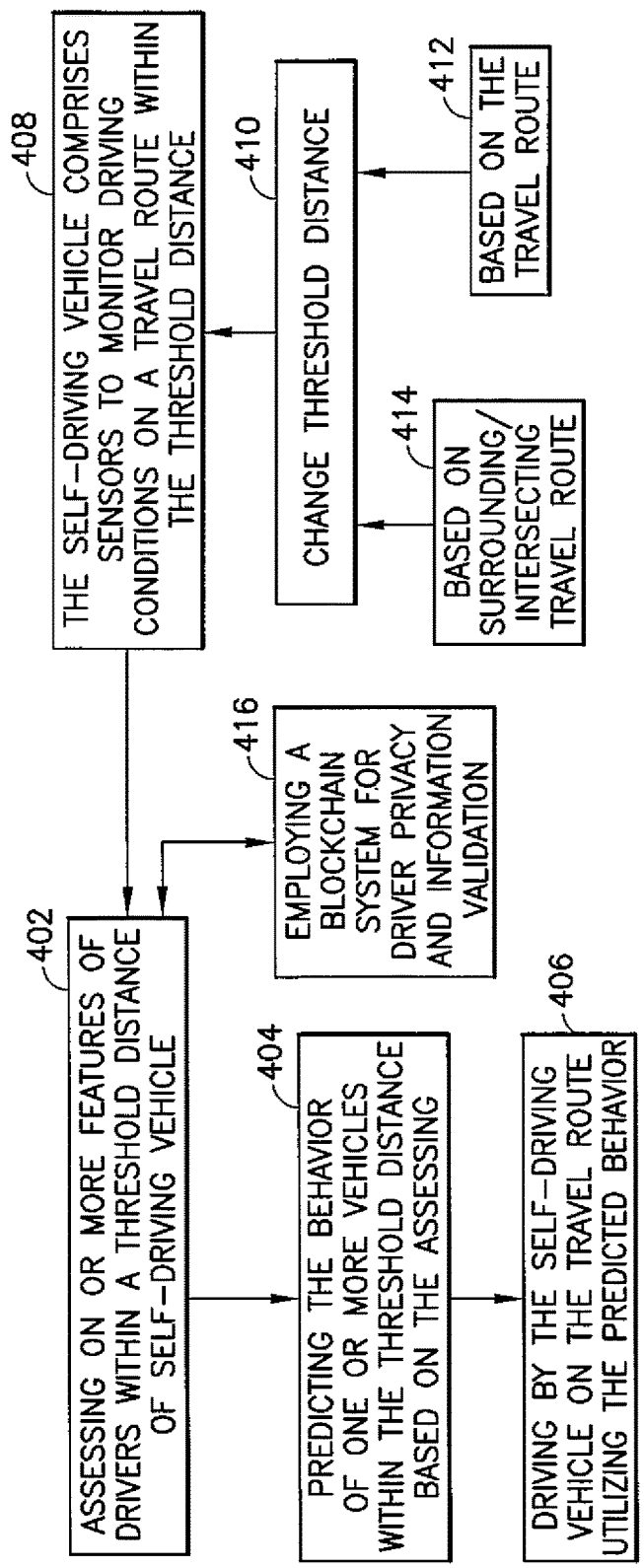
FIG. 4 is a logic flow diagram for modifying behavior of an autonomous vehicle based on advanced predicted behavior analysis of nearby drivers, and illustrates the operation of an exemplary method, a result of execution of computer program instructions embodied on a computer readable memory, functions performed by logic implemented in hardware, and/or interconnected means for performing functions in accordance with exemplary embodiments.

The apparatus such as an SDV 170 can provide functionality to the operations described herein below. FIG. 4 is a block diagram of an example of a logic flow diagram that illustrates the operation of an example of a method, a result of execution of computer program instructions embodied on a computer readable memory, and/or functions performed by logic implemented in hardware, in accordance with exemplary embodiments herein. The blocks in the figure may be considered to be means for performing the function in the blocks. Furthermore, each block in FIG. 4 may be implemented as a module, such as a circuit or other hardware, for performing the function in the block. The blocks in FIG. 4 may also be an example of an implementation of the SD-Module in FIG. 1, such that the SD-Module would be the module determining the yet further SDV. Thus, in FIG. 1, SDV 170, for example, under control of the SD-Module, performs the appropriate blocks in FIG. 4. The SDV 170 or SD-Module of FIG. 1 could also be thought of as the means for performing the steps of the method or any aspects of the methods described herein or as illustrated in FIG. 4. Similarly, the SDO-Module may also be means of performing aspects of the method described herein. Additionally, the SDX-Module may also be means of performing aspects of the method described herein.

As discussed herein, a method and system would comprise a self-driving vehicle (SDV), a means for assessing one or more features of drivers within threshold distance D (for example, a driving history of drivers in nearby cars), and, based on such assessment, a system which makes prediction(s) concerning the behavior of one or more nearby vehicles.

The threshold distance D may be changed based on road conditions, weather, time of day, and nearby vehicle types/classes (for example, motorcycles, trucks, other conventionally human-driven vehicles, and SDVs of those types) and safety features of nearby vehicles (for instance, snow tires on nearby vehicles, specialized breaks, etc.). The threshold distance D may also be changed based on social aspects of the surrounding environment such as, for instance, the number of pedestrians, the density of crowd, the turbulence of crowd, the presence of children and other classes requiring extra vigilance such as the presence of people on skateboards, in strollers, on bikes, in wheel chairs, etc.

The features of nearby drivers may include: past driving history, cohort of driver (for example, a beginner driver), a driver's behavior over the previous N number of minutes, etc. Many of these aspects may be gleaned in a privacy preserving manner, since the actual identity of the drivers is not necessary and thus would not need to be provided. For example, some of this information is associated with insurance records. Sometimes, the system may not be 100% certain as to "who" is driving the nearby car, but, nevetheless, various aspects of a driver's behavior may be known (for instance, for the last N number of minutes). Similarly, if a driver is registered as the only driver of a car, for instance for insurance purposes, the likelihood that his person is driving is high.

Other features of nearby drivers may include moment-to-moment behavior that enables prediction of how much attention those drivers are devoting to the task of driving (for example, a highly skilled driver who is distracted is likely to perform differently than a highly skilled driver who is not distracted). Features of the driver and environment that can contribute to analysis of attention focus include:

- Observations of driving characteristics, particularly changes in variance of driving behaviors (for example, a large variance in reaction time to stoplights may indicate a distracted state);
- Observations of driver non-driving behaviors, such as talking, gesturing, using a cell phone, looking in many directions, not looking at the road, operating other functions of a vehicle (for example, adjusting the rear view mirror);
- Observing proximal human behavior that may distract the driver, such as a companion who is speaking or gesturing, or a group of children near the side of the road that may distract the driver from watching vehicles ahead;
- Detecting proximal events that may distract the driver such as an accident site, a public disturbance, or a beautiful view; and
- Sensing of physiological characteristics of drivers which can affect their level of attention such as signs of drowsiness, intoxication, emotional arousal.

Observing, detecting, and sensing of the driver behavior data can be collected by the in-vehicle sensors of the driver's vehicle in real-time and uploaded onto a cloud data hub, designated herein as a Mobility Information Hub (MIH), to which the SDV can subscribe to. This MIH comprises aggregated historical data (for example, driving behaviors, road conditions, etc.), various advanced real-time analytics modules such as driver behavior analytics (for instance, behavior of risky driving maneuver from past driving history), real-time recommendation analytics (for example, recommending patterns for modifying behaviors), prediction models, etc. A local copy of MIH can reside on SDV, wherein the local copy is updated by syncing with the cloud MIH.

Additionally, anywhere discussed herein where the invention makes use driver data, such data can reside on the MIH.

Time series statistical analysis may be used to find similar drivers based on observed driver behavior and characteristics over the previous N minutes using data in MIH and just observed, detected, or sensed data. This may help to refine the prediction of nearby behaviors such that SDV modification strategies can be reused without the need of knowing the actual driver. This analysis may be done in "real-time", wherein one of the inputs into such systems are models of driver behavior, so that the user can make changes to the road network and ask "what-if" questions.

The prediction of nearby behavior may be used to determine a risk of collision and alter SDV alert levels. Nearby driver behavior prediction can also be used to improve or attempt to ensure optimal throughput (vehicle flow) in a given traffic situation.

SDV alert levels may be used to change the user's SDV speed, position, lane, vigilance (for example, Light Imaging, Detection, And Ranging (LIDAR) sensor data are processed in greater detail, and/or with different algorithms, etc.), etc. Also, additional sensors may be called into use based on the alert levels. The notion of activating a specific set of sensors based on driving context to ensure safety could also be employed. This could also mean that sensors (and/or backup or redundant sensors) of nearby vehicles with varying capabilities can be leveraged and dynamically turned on. For example, a determination can be made concerning a set of sensors that needs to be turned on to ensure safety and vehicle headway. The system also can dynamically turn on the sensors of other vehicles to ensure safety and efficiency.

FIG. 2 illustrates a car 202 where a change of sensor and algorithmic "vigilance" may be employed. Such a vehicle would have a variety of devices onboard to detect other vehicles, to sense its surroundings, and to interact with remote database(s) regarding information regarding other drivers, the surrounding vicinity, etc.

Car 202 is pictured with a camera 204, a LIDAR 206, a GPS information transmitter/receiver 208, a wheel encoder 210, radar 212, and ultrasonic sensors 214. Any of these devices could be present and/or present in multiple configurations, multiple individual units, and/or multiple locations. The figure only gives an example of an embodiment. Moreover, the car 202 could contain onboard mapping units 216 and modules 218 which gather the information for all the sources and process that information to self-drive the vehicle.

Of course, a vehicle configured to operate in an autonomous mode may determine a current state of the vehicle and the current state of the environment of the vehicle in numerous ways. The environment of the vehicle includes at least one other vehicle on a road, at an intersection, on a bridge, near a train track, etc.

A predicted behavior of the other vehicles may be determined based, at least partly, on the current state of the vehicles and the current state of the environment of the vehicle (which includes an assessment of the drivers of nearby vehicles). A confidence level may also be determined based on the predicted behavior, the current state of the vehicle, and the current state of the environment of the vehicle.

There is a potential for lifelong learning in the SDV based on the predicted and the actual maneuver of the vehicles/drivers. If the SDV encounters a scenario with a set of behaviors that it has not dealt with before it should keep track of successful or failed maneuvers in these scenarios to learn them overtime.

An accident score may be assigned to individual drivers based on one or more previous-incident databases, wherein the score can be updated based on newly sensed data.

The driver behavior may be monitored with the use of an array of sensing capabilities including inertial sensors such as accelerometer and gyroscope, as well as GPS with the driver maneuver in the context, for example, over-speeding with speed-bump, swerving with road events (for instance, potholes, other hazards, etc.), harsh-braking with speed-bump.

Embodiments of the current invention also consider predicted behavior of the nearby drivers, and their histories. This driver-centric emphasis is at least a novel aspect of this invention. For example, perhaps the other driver is known to be a "beginner" or driving in an overconfident or nervous way during the previous 4 minutes. The vehicle in the autonomous mode may be controlled based on the predicted behavior, the confidence level, and the current state of the vehicle and its environment.

Figure 3:
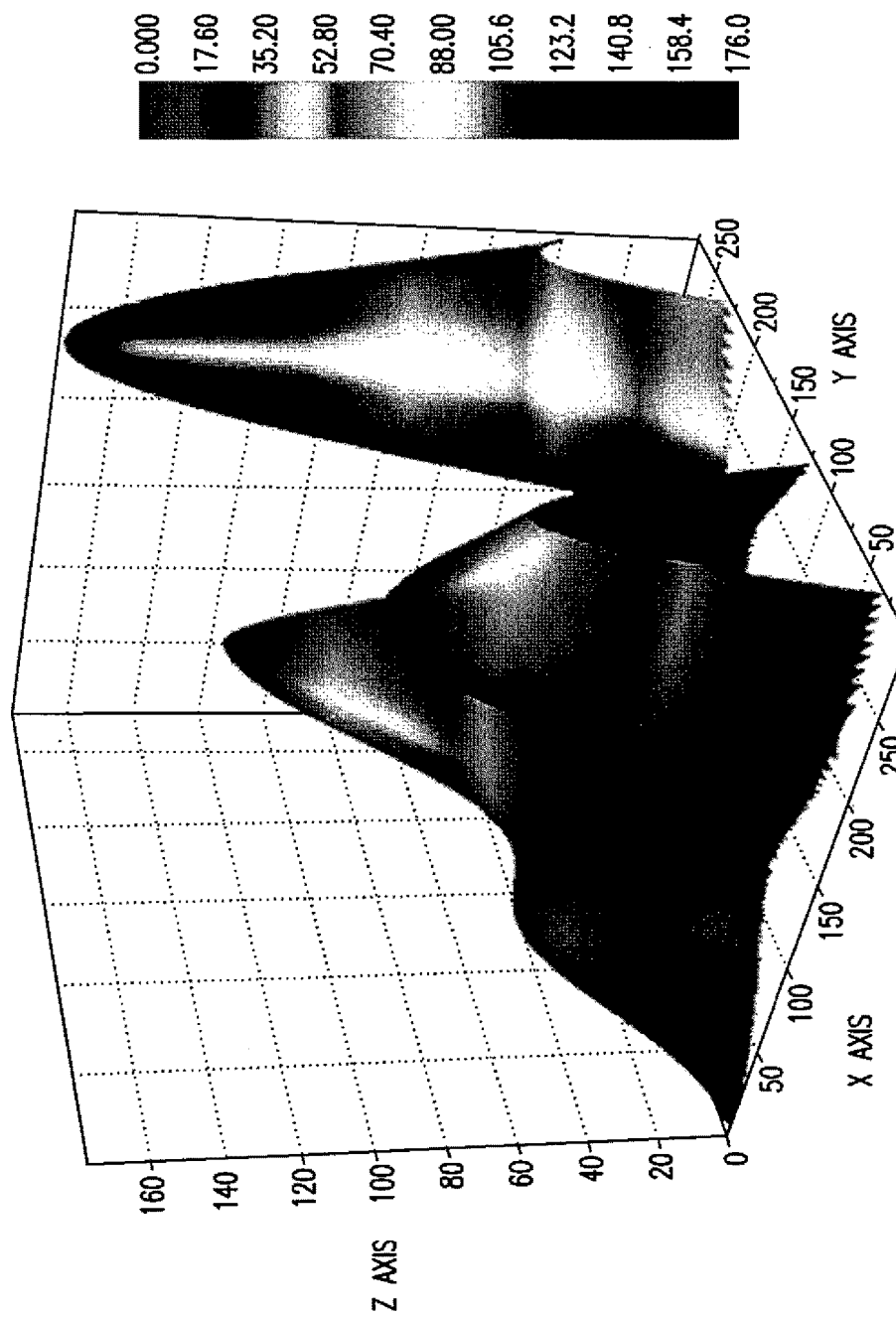
FIG. 3 is a graph showing a 3D heat map showing relative risks of a nearby vehicle.

FIG. 3 is a graphical representation of a 3D heat map showing relative risks of a nearby vehicle based on driver analysis and other features. Note that risk may not be symmetrical in all directions around a vehicle or motorcycle.

The driver behavior may also include the detection of car-jacking behavior using visual analytics using a camera installed on the SDC, video feed of street cameras, or crowdsourced data on the MIH.

If necessary, in order to use the functionality gained by the information discusses herein yet still preserve the privacy of others, for instance the drivers of other vehicles, or the entire MIH, our invention can employ blockchain for such driver privacy and information validation: the sensor data is logged into the blockchain system wherein any transaction that write or read data to/from the blockchain system is managed by blockchain's built-in consensus algorithms. Each vehicle and driver are registered member through the blockchain membership services (for instance, a PKI system of the blockchain's membership services, where public key infrastructure (PKI) is a set of roles, policies, and procedures needed to create, manage, distribute, use, store, and revoke digital certificates and manage public-key encryption). PKI generates the right public-private pair associate to each SDV/driver, wherein each data uploading or accessing transaction is cryptographically signed using private key.

The open blockchain network (such as IBM's hyper-ledger) may be used to maintain the MIH which contains driving history of drivers within a distance of the current SDV. The SDV may be one of the nodes in the open blockchain network to participate on transaction validation (for example, uploading data). Our invention may implement advanced analytics/learning models (for instance, driver behavior models) on top of the open blockchain. Thus, the system only allows authorized entities (SDV, a driver, traffic control node, etc.) to access data and models. The SDV may fetch the predicted behavior of the nearby drivers in real-time via a blockchain client application by passing the nearby driver(s) identification (for instance, a license plate number).

In an example of an embodiment, the system may learn the environment context from crowdsourcing wisdom, other blockchain controlled data sources, etc. In-vehicle sensors may have a feed video stream for visual analytics and deep learning to assess vehicle behavior, etc.

In another example of an embodiment, based on the predicted risk level (for instance, a low risk of collision) and the computed distance D, the SDV may send a signal to the horn device or to the light controlling device (e.g., flash the high beams on and off or on the hazard lights) to alert the nearby drivers before modifying the behavior of autonomous vehicle.

Although our invention is directed towards SDVs, many aspects of the current invention have application to drones (autonomous flying vehicles) and drone safety, given the nature of the drone operators, history of drone operation, and related characteristics.

This may be useful to minimize the cost of modifying the behavior of SDV, wherein the cost is measured by comparing the time it will take the change, the risk level, etc.

Thus, as described herein, an exemplary method or system comprises a self-driving vehicle (SDV), a means for assessing one or more features of drivers within threshold distance D (e.g. driving history of drivers), and based on said assessing, the system makes a prediction of behavior of one or more near vehicles. In this method, the threshold distance D is changed based on factors such as road conditions, weather, time of day, and nearby vehicle types/classes (e.g. motorcycle, trucks, SDV vs conventional vehicle), and safety features of nearby vehicles (e.g. snow tires on nearby vehicle, etc.). The threshold distance D may also be changed based on social aspects of the surrounding environment such as number of pedestrians, density of crowd, turbulence of crowd, presence of children and other classes requiring extra vigilance, presence of people on skateboards, in strollers, on bikes, in wheel chairs, etc.

Features of drivers could be any of: past driving history, cohort of driver (e.g. beginner driver), a driver's behavior over the previous N minutes, etc. The prediction of nearby behavior is used to determine a risk of collision and alter SDV alert levels and these alert levels can change the SDV's speed, position, lane, vigilance (e.g. LIDARs sensor data are processed in greater detail and/or with different algorithms, etc.). Additionally, sensor, including backup or redundant sensors, of nearby vehicles with varying capabilities can be leveraged and dynamically turned on.

Exemplary embodiments of this SDV system employ blockchain for driver privacy and information validation: the sensor data is logged into the blockchain system wherein any transaction that write or read data to/from the blockchain system is managed by consensus. An open blockchain network (such as IBM's hyper-ledger) would maintain the driving history of drivers within a distance of the current SDV. The SDV may fetch the predicted behavior of the nearby drivers in real-time via blockchain client application by passing the nearby driver s) identification (for example a license plate number). Moreover, the system learns the environment context from wisdom crowdsourcing, blockchain data sources, etc. In-vehicle sensors may have a feed video stream for visual analytics and deep learning to assess the vehicle behavior, etc.

Also, drivers include those operating mobile machinery such as forklifts, bulldozers, etc.

Furthermore, the current invention need not be limited to cars, automobiles, or other surface vehicles such as motorcycles, trucks, or construction vehicles but cold also apply to underground or mining vehicles or equipment or also drones or autonomous flying vehicles.

The level of the driver's attention to driving is estimated based on any of: high variance of reaction time to particular events; non-driving behaviors such as talking, looking around, adjusting a mirror; detection of proximal human behavior such as a companion who is talking or gesturing; detection of potentially distracting proximal events such as a roadside accident; physiological signs of attentional deficits such as drowsiness, intoxication, etc.

FIG. 4 is a logic flow diagram for modifying behavior of an autonomous vehicle based on advanced predicted behavior analysis of nearby drivers, and illustrates the operation of an exemplary method, a result of execution of computer program instructions embodied on a computer readable memory, functions performed by logic implemented in hardware, and/or interconnected means for performing functions in accordance with exemplary embodiments.

Block 402 describes the step of assessing one or more features of drivers within a threshold distance of a self-driving vehicle. Based on that assessing, block 404 describes the step of predicting the behavior of one or more vehicles within the threshold distance. Utilizing the predicted behavior, block 406 describes the step of then driving the self-driving vehicle.

Other exemplary embodiments have, as shown in block 408, the self-driving vehicle comprising sensors to monitor driving conditions on a travel route within the threshold distance. Exemplary embodiments can also determine that the threshold distance is changed is seen from block 410 based on aspects found along the travel route as see from block 412 and/or based on aspects in the surrounding or intersecting the travel route as seen from block 414.

Additional exemplary embodiments employ a blockchain system for driver privacy and information validation as described elsewhere herein and shown in block 416.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, for instance in n FIG. 1. A computer-readable medium may comprise a computer-readable storage medium (e.g., 104, 134 or other device) that may be any media or means that can contain, store, and/or transport the instructions for use by or in connection with an instruction execution system, apparatus, or device, such as a computer. A computer-readable storage medium does not comprise propagating signals.

An example of an embodiment, which can be referred to as item 1, is a method that comprises assessing one or more features of drivers within a threshold distance of a self-driving vehicle, wherein the self-driving vehicle comprises sensors to monitor driving conditions on a travel route within the threshold distance, predicting the behavior of one or more vehicles within the threshold distance based on the assessing, and driving by the self-driving vehicle on the travel route utilizing the predicted behavior.

An example of a further embodiment, which can be referred to as item 2, is the method of item 1, where the threshold distance is changed based on at least one of the following on the travel route: road conditions; weather conditions; time of day; types/classes of nearby vehicles; safety features of nearby vehicles.

An example of a further embodiment, which can be referred to as item 3, is the method of item 1, where the threshold distance is changed based on at least one of the following aspects surrounding and/or intersecting the travel route: number of pedestrians; density of pedestrians; turbulence of pedestrians; presence of children and other classes requiring extra vigilance; presence of people utilizing other types of vehicles not requiring licenses.

An example of a further embodiment, which can be referred to as item 4, is the method of item 1, where the one or more features comprise at least one of the following: past driving history; cohort of driver; and behavior of the driver over a previous time period.

An example of a further embodiment, which can be referred to as item 5, is the method of item 1, which additionally comprises at least one of the following: communicating with at least one other vehicle within the threshold distance; activating sensors in at least one other vehicle within the threshold distance and utilizing such active sensor data; accessing data from at least one other vehicle within the threshold distance; and dynamically controlling the driving of at least one other self-driving vehicle within the threshold distance.

An example of a further embodiment, which can be referred to as item 6, is the method of item 1, which additionally comprises, determining a risk of collision based on the predicting and altering an alert level in response to a risk of collision determined to be over a threshold.

An example of a further embodiment, which can be referred to as item 7, is the method of item 6, which additionally comprises changing the driving by the self-driving vehicle in response to the altering of the alert level by at least one of the following: speed; position; and lane; and vigilance.

An example of a further embodiment, which can be referred to as item 8, is the method of item 7, where vigilance comprises at least one of the following: a detail level of processing data retrieved from sensor monitoring; an algorithm of processing data retrieved from sensor monitoring; a usage level of data retrieved from sensor monitoring; a weighting of data retrieved from sensor monitoring; a utilization of data from an activation of backup, redundant, and/or secondary sensors to monitor the travel route; a leveraging of data from communicating with other vehicles within the threshold distance; and a mixing of data by dynamically controlling sensors of various capabilities.

An example of a further embodiment, which can be referred to as item 9, is the method of item 1, which additionally comprises employing a blockchain system for driver privacy and information validation, wherein the blockchain system maintains a driving history of the one or more features of drivers within the threshold distance.

An example of a further embodiment, which can be referred to as item 10, is the method of item 9, where the employing comprises logging the sensor data into the blockchain system, wherein any transaction that writes or reads data to/from the blockchain system is managed by consensus.

An example of a further embodiment, which can be referred to as item 11, is the method of item 9, which further comprises fetching the one or more features of drivers within the threshold distance in real-time via a client application connected to the blockchain system, wherein the fetching is based on an identification associated with drivers.

An example of a further embodiment, which can be referred to as item 12, is the method of item 9, where the blockchain system is an open blockchain network such as IBM's hyper-ledger.

An example of a further embodiment, which can be referred to as item 13, is the method of item 1, which further comprises learning an environment context from at least wisdom crowdsourcing, blockchain data sources, or collaborative networks.

An example of a further embodiment, which can be referred to as item 14, is the method of item 1, where in-vehicle sensors comprise a feed video stream for visual analytics and deep learning to assess the vehicle behavior.

An example of a further embodiment, which can be referred to as item 15, is the method of item 1, where the self-driving vehicle autonomous flying vehicle such as a drone.

An example of a further embodiment, which can be referred to as item 16, is the method of item 1, where the one or more features comprises a level of the driver's attention to driving, estimated upon at least one of the following: high variance of reaction time to particular events; non-driving behaviors such as talking, looking around, adjusting a mirror; detection of proximal human behavior such as a companion who is talking or gesturing; detection of potentially distracting proximal events such as a roadside accident; and physiological signs of attentional deficits such as drowsiness, intoxication, etc.

An example of a further embodiment, which can be referred to as item 17, is the method of item 1, where the drivers comprise those operating mobile machinery such as forklifts, bulldozers, etc.

An example of another embodiment of the present invention, which can be referred to as item 18, is an apparatus comprising: at least one processor; at least one memory including computer program code, wherein the at least one processor, in response to execution of the computer program code, is configured to cause the apparatus to perform at least the following: assessing one or more features of drivers within a threshold distance of a self-driving vehicle, wherein the self-driving vehicle comprises sensors to monitor driving conditions on a travel route within the threshold distance; based on the assessing, predicting the behavior of one or more vehicles within the threshold distance; and driving by the self-driving vehicle on the travel route utilizing the predicted behavior.

An example of another embodiment of the present invention, which can be referred to as item 19, is a computer program comprising code for assessing one or more features of drivers within a threshold distance of a self-driving vehicle, wherein the self-driving vehicle comprises sensors to monitor driving conditions on a travel route within the threshold distance; based on the assessing, predicting the behavior of one or more vehicles within the threshold distance; and driving by the self-driving vehicle on the travel route utilizing the predicted behavior.

An example of a further embodiment, which can be referred to as item 20, is the computer code of item 19, where the computer program is embodied on a computer program product comprising a computer-readable medium bearing computer program code therein for use with a computer.

An example of another embodiment of the present invention, which can be referred to as item 21, is computer program product that, when executed by a computer, performs the method encoded therein.

An example of yet another embodiment of the present invention, which can be referred to as item 22, is an apparatus with means for assessing one or more features of drivers within a threshold distance of a self-driving vehicle, wherein the self-driving vehicle comprises sensors to monitor driving conditions on a travel route within the threshold distance, means for predicting the behavior of one or more vehicles within the threshold distance based on the assessing, and means for driving by the self-driving vehicle on the travel route utilizing the predicted behavior.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   assessing one or more features of drivers within a threshold distance of a self-driving vehicle, wherein the self-driving vehicle comprises sensors to monitor driving conditions on a travel route within the threshold distance;
   based on the assessing, predicting a behavior of one or more vehicles within the threshold distance;
   driving by the self-driving vehicle on the travel route utilizing the predicted behavior.

2. The method of claim 1, wherein the threshold distance is changed based on at least one of the following on the travel route:
   road conditions;
   weather conditions;
   time of day;
   types/classes of nearby vehicles;
   safety features of nearby vehicles.

3. The method of claim 1, wherein the threshold distance is changed based on at least one of the following aspects surrounding and/or intersecting the travel route:
   number of pedestrians;
   density of pedestrians;
   turbulence of pedestrians;
   presence of children and other classes requiring extra vigilance;
   presence of people utilizing other types of vehicles not requiring licenses.

4. The method of claim 1, wherein the one or more features comprise at least one of the following:
   past driving history;
   cohort of driver; and
   behavior of the driver over a previous time period.

5. The method of claim 1, further comprising at least one of the following:
   communicating with at least one other vehicle within the threshold distance;
   activating sensors in at least one other vehicle within the threshold distance and utilizing such active sensor data;
   accessing data from at least one other vehicle within the threshold distance; and
   dynamically controlling the driving of at least one other self-driving vehicle within the threshold distance.

6. The method of claim 1, further comprising:
   based on the predicting, determining a risk of collision and, in response to a risk of collision determined to be over a threshold, altering an alert level.

7. The method of claim 6, further comprising:
   in response to the altering of the alert level changing the driving by the self-driving vehicle by at least one of the following:
   speed;
   position; and
   lane; and
   vigilance.

8. The method of claim 7, wherein vigilance comprises at least one of the following:
   a detail level of processing data retrieved from sensor monitoring;
   an algorithm of processing data retrieved from sensor monitoring;
   a usage level of data retrieved from sensor monitoring;
   a weighting of data retrieved from sensor monitoring;
   a utilization of data from an activation of backup, redundant, and/or secondary sensors to monitor the travel route;

a leveraging of data from communicating with other vehicles within the threshold distance; and a mixing of data by dynamically controlling sensors of various capabilities.

9. The method of claim 1, further comprising:

employing a blockchain system for driver privacy and information validation, wherein the blockchain system maintains a driving history of the one or more features of drivers within the threshold distance.

10. The method of claim 9, wherein the employing comprises logging the sensor data into the blockchain system, wherein any transaction that writes or reads data to/from the blockchain system is managed by consensus.

11. The method of claim 9, further comprising, fetching the one or more features of drivers within the threshold distance in real-time via a client application connected to the blockchain system, wherein the fetching is based on an identification associated with drivers.

12. The method of claim 9, wherein the blockchain system is an open blockchain network.

13. The method of claim 1, further comprising:

learning an environment context from at least wisdom crowdsourcing, blockchain data sources, or collaborative networks.

14. The method of claim 1, wherein the sensors of the self-driving vehicle further comprise a feed video stream for visual analytics and deep learning.

15. The method of claim 1, wherein the self-driving vehicle is an autonomous flying vehicle).

16. The method of claim 1, wherein the one or more features comprises a level of the driver's attention to driving, estimated upon at least one of the following:

high variance of reaction time to particular events;

non-driving behaviors such as talking, looking around, adjusting a mirror;

detection of proximal human behavior such as a companion who is talking or gesturing;

detection of potentially distracting proximal events such as a roadside accident; and physiological signs of attentional deficits.

17. The method of claim 1, wherein drivers comprise those operating mobile machinery.

18. An apparatus, comprising:

at least one processor; and at least one memory including computer program code, the at least one memory and the computer program code configured to, with the at least one processor, cause the apparatus to perform at least the following:

assessing one or more features of drivers within a threshold distance of a self-driving vehicle, wherein the self-driving vehicle comprises sensors to monitor driving conditions on a travel route within the threshold distance;

based on the assessing, predicting a behavior of one or more vehicles within the threshold distance;

driving by the self-driving vehicle on the travel route utilizing the predicted behavior.

19. A computer program product comprising a tangible computer-readable medium bearing computer program code embodied therein for use with a computer, the computer program code comprising code for:

assessing one or more features of drivers within a threshold distance of a self-driving vehicle, wherein the self-driving vehicle comprises sensors to monitor driving conditions on a travel route within the threshold distance;

based on the assessing, predicting a behavior of one or more vehicles within the threshold distance;

driving by the self-driving vehicle on the travel route utilizing the predicted behavior.

* * * * *